(12) United States Patent
Lin et al.

(10) Patent No.: US 10,775,908 B1
(45) Date of Patent: Sep. 15, 2020

(54) LUMINOUS SCROLL MODULE

(71) Applicant: Primax Electronics Ltd., Taipei (TW)

(72) Inventors: Jia-Hung Lin, Taipei (TW); A-Ming Chang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/548,768

(22) Filed: Aug. 22, 2019

(30) Foreign Application Priority Data

Jun. 28, 2019 (TW) .............................. 108122933 A

(51) Int. Cl.
*G09G 1/00* (2006.01)
*G06F 3/0362* (2013.01)
*G06F 3/0354* (2013.01)
*F21V 33/00* (2006.01)

(52) U.S. Cl.
CPC ........ *G06F 3/0362* (2013.01); *G06F 3/03543* (2013.01); *F21V 33/00* (2013.01)

(58) Field of Classification Search
CPC ......... G06F 3/033; G06F 3/0354; G06F 3/039
See application file for complete search history.

(56) References Cited

U.S. PATENT DOCUMENTS

| 2010/0001956 A1* | 1/2010 | Choi | ....................... G06F 3/042 345/166 |
| 2018/0275775 A1* | 9/2018 | Zhang | ................... G06F 3/0362 |

\* cited by examiner

*Primary Examiner* — Michael A Faragalla
(74) *Attorney, Agent, or Firm* — Kirton McKonkie; Evan R. Witt

(57) ABSTRACT

The present invention provides a luminous scroll module applied to a mouse, including: a scroll, an inner wheel, and a luminous module. The inner wheel is arranged in a groove of the scroll, and the scroll is capable of rotating relative to the inner wheel. The luminous module is arranged in the inner wheel. A luminous unit of the luminous module is configured to emit a light beam, and the light beam passes through a light source opening of the inner wheel to the scroll.

10 Claims, 9 Drawing Sheets

1

LUMINOUS SCROLL MODULE

FIELD OF THE INVENTION

The present invention relates to a scroll module, and in particular, to a luminous scroll module applied to a mouse.

BACKGROUND OF THE INVENTION

A mouse is used to control a cursor on a computer screen, thereby operating a calculator or a computer. In addition to a left button and a right button, a scroll of the mouse is the most commonly used button by ordinary users, for example, browsing a web page or moving the cursor by rotating the scroll, outputting a middle button signal by pressing the scroll, or switching different function modes.

However, to make it more comfortable for a user to operate a mouse, a plurality of ergonomic designs is also broadly applied to a housing of the mouse. As shown in FIG. 1, a mouse 9 includes: a housing 91 and a scroll 92. The housing 91 includes a top cover 911 and a bottom 912, and a control end of the top cover 911 has a tilted design from upper right to bottom left, so that a user can place fingers more comfortably. Besides, to improve convenience of operating the mouse in a dusky environment and to attract attention of consumers, the scroll 92 usually has a luminous function. As shown in FIG. 2A and FIG. 2B, the scroll 92 is provided with a groove 921, where a rotating shaft 922 protrudes from a bottom surface of the groove; a luminous module 93 includes a circuit board 931 and a luminous unit 932, where the luminous unit 932 is configured to emit a light beam to the scroll 92, so that the scroll 92 generates a visual effect of luminescence; and a middle button switch module 94 is disposed below the rotating shaft 922.

In prior art, when the luminous module 93 is disposed above the rotating shaft 922 (as shown in FIG. 2A), the luminous module 93 is excessively close to the top cover 911, so that the tilted design of the top cover 911 is affected. Moreover, when the scroll 92 is pressed, the luminous module 93 does not decline with the scroll 92, so that the luminous unit 932 is excessively close to an inner circumference of the groove 921, resulting in a change in the luminance of the scroll 92 or a problem of light leakage. When the luminous module 93 is disposed below the rotating shaft 922 (as shown in FIG. 2B), the rotating shaft 922 blocks light beams emitted by the luminous unit 932, resulting in a decrease in the luminance of the scroll 92. In another aspect, the rotating shaft 922 may abut against the middle button switch module 94. When the scroll 92 rotates, the rotating shaft 922 that rotates with the scroll 92 may continuously rub against the middle button switch module 94, resulting in occurrence of noises when operating the scroll 92, or even resulting in a damage to middle button switch module 94.

Therefore, how to provide a luminous scroll module, in which configuration of the luminous module does not affect the tilted design of the control end of the mouse, problems such as luminance decrease, luminance change, and light leakage of the luminous scroll module are avoided, and in another aspect, abrasion of the middle button switch module is alleviated is a technical subject to be solved in the present invention.

SUMMARY OF THE INVENTION

A main objective of the present invention is to provide a luminous scroll module, in which configuration of a luminous module does not affect a tilted design of a control end of a mouse, problems such as luminance decrease, luminance change, and light leakage of the luminous scroll module are avoided, and in another aspect, abrasion of a middle button switch module is alleviated.

To achieve the above objective, the present invention provides a luminous scroll module, applied to a mouse, including:

a scroll, including:
a groove; and
a clamping element, disposed on a bottom surface of the groove;
an inner wheel, disposed in the groove, including:
a first side plate, provided with a first opening;
a second side plate, pivotally connected to the clamping element, so that the scroll rotates relative to the inner wheel; and
an outer ring wall, connecting the first side plate and the second side plate to form an accommodating space, where the outer ring wall is provided with a light source opening and the accommodating space is in communication with the first opening and the light source opening; and
a luminous module, including:
a circuit board; and
a luminous unit, disposed on a surface of the circuit board, where
the circuit board partially passes through the first opening, so that the luminous unit is arranged in the accommodating space, where the luminous unit is configured to emit a light beam and the light beam passes through the light source opening to the scroll.

In aforementioned preferable implementation, an outer circumference of the scroll is provided with an annular groove and a rim is sheathed in the annular groove.

In the aforementioned preferable implementation, the scroll is provided with a rotating shaft and the rotating shaft is disposed on another surface opposite to the groove.

In the aforementioned preferable implementation, the luminous scroll module further includes a circular shading element, where the circular shading element is configured to cover another surface opposite to the groove and is provided with a central hole corresponding to the rotating shaft.

In the aforementioned preferable implementation, the rotating shaft is provided with a polygonal shaft portion and the polygonal shaft portion is configured to connect an encoder of the mouse.

In the aforementioned preferable implementation, a pressing element protrudes from an outer surface of the first side plate and the pressing element is located at a side of the first opening to press a middle button switch module in the mouse.

In the aforementioned preferable implementation, the pressing element is provided with a pressing portion and a fastening portion connected to the pressing portion, the pressing portion is configured to press a triggering portion of the middle button switch module, and the fastening portion is configured to carry and fasten the circuit board.

In the aforementioned preferable implementation, the second side plate is provided with a second opening.

In the aforementioned preferable implementation, the clamping element is provided with a stopping portion and a necking portion connected to the stopping portion, and the stopping portion is capable of being forced into the second opening, so that the second side plate is clamped at the necking portion.

In the aforementioned preferable implementation, where an end of the circuit board that passes through the first opening is provided with a receiving opening, and the receiving opening corresponds to the stopping portion, to avoid interference between the circuit board and the clamping element.

In the aforementioned preferable implementation, the luminous scroll module further includes an annular shading element, where the annular shading element is disposed around the groove and configured to cover a gap between the scroll and the first side plate.

DETAILED DESCRIPTION OF THE PREFERRED EMBODIMENT

Advantages and features of the present invention, and methods to achieve the advantages and the features will be described in detail by referring to illustrative embodiments and accompanying drawings, so as to be more comprehensible. However, the present invention can be implemented in different forms and should not be understood to be limited to the embodiments stated herein. In contrast, for persons skilled in the art, the embodiments provided herein may enable the disclosure to convey the scope of the present invention thoroughly, comprehensively, and completely.

Figure 1:
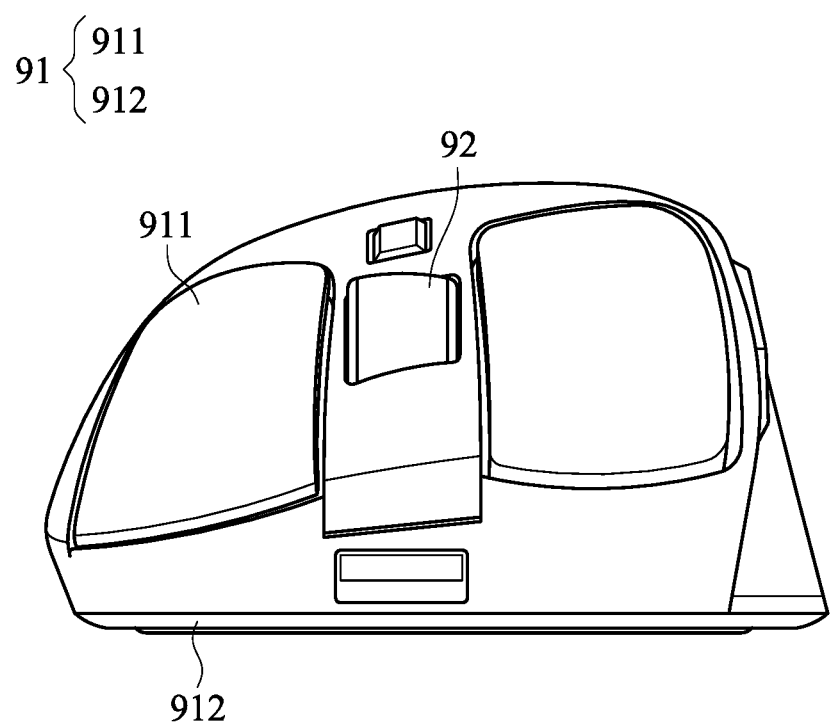
FIG. 1 is a front view of a conventional mouse.
Figure 2A:
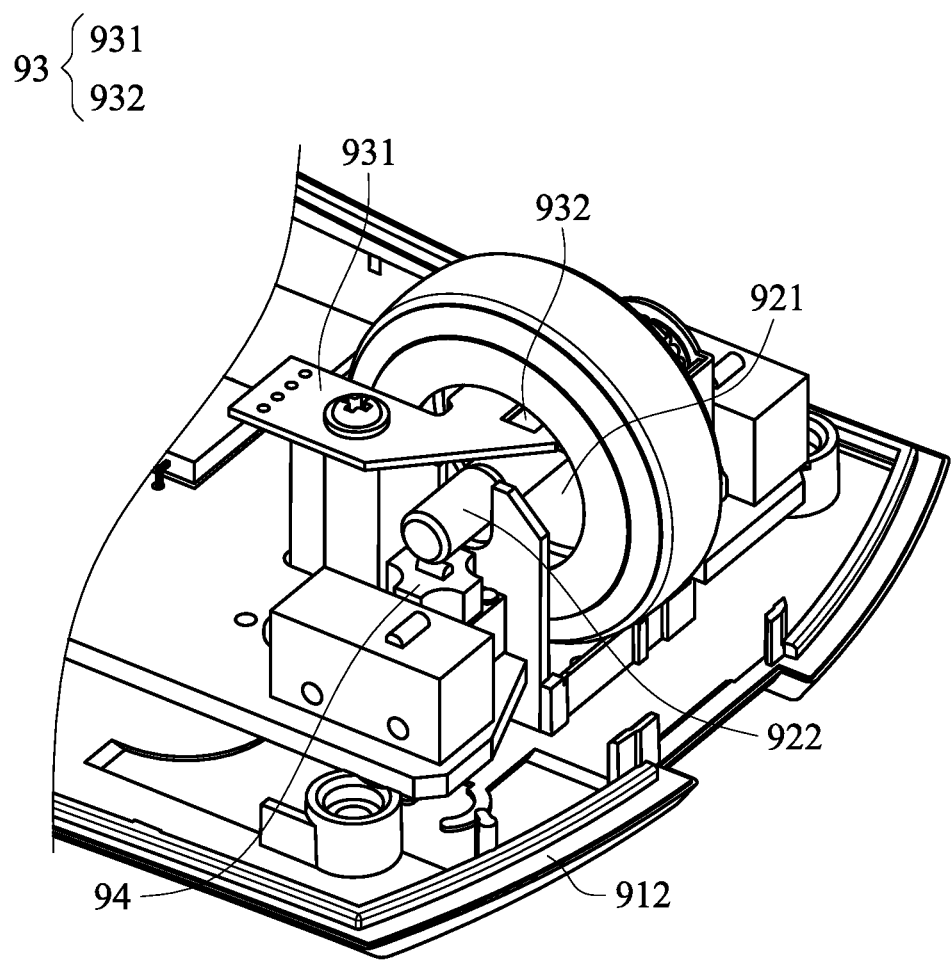
FIG. 2A and FIG. 2B are schematic three dimensional views of a scroll structure of a conventional mouse.
Figure 2B:
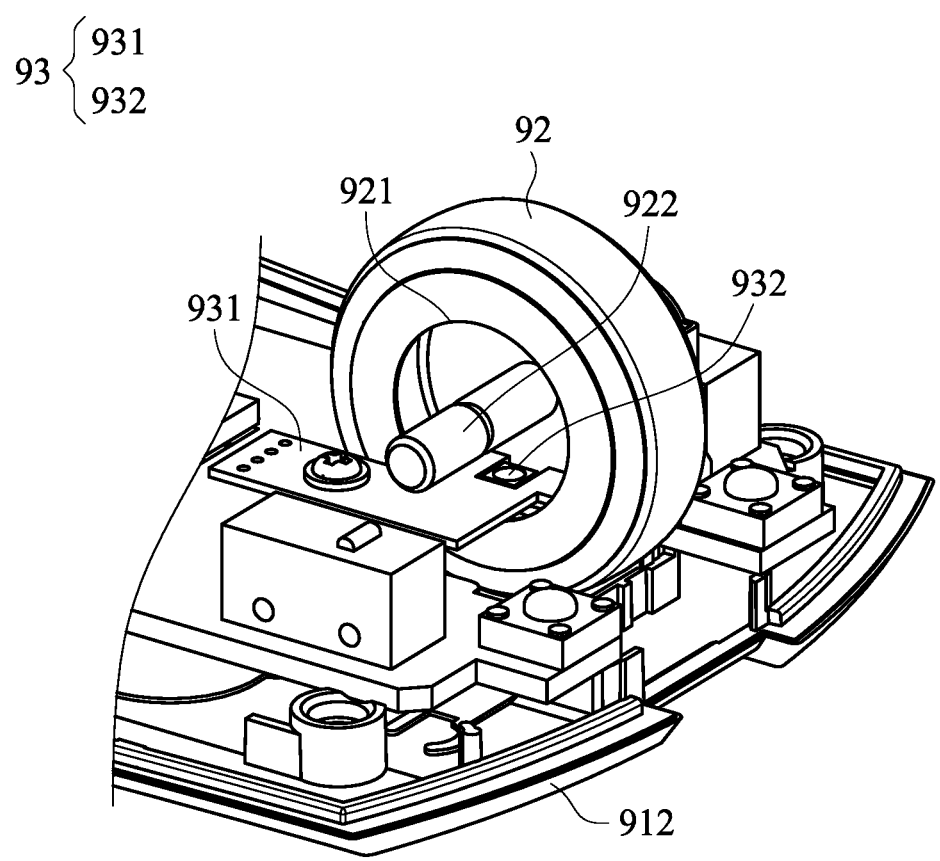
Figure 3:
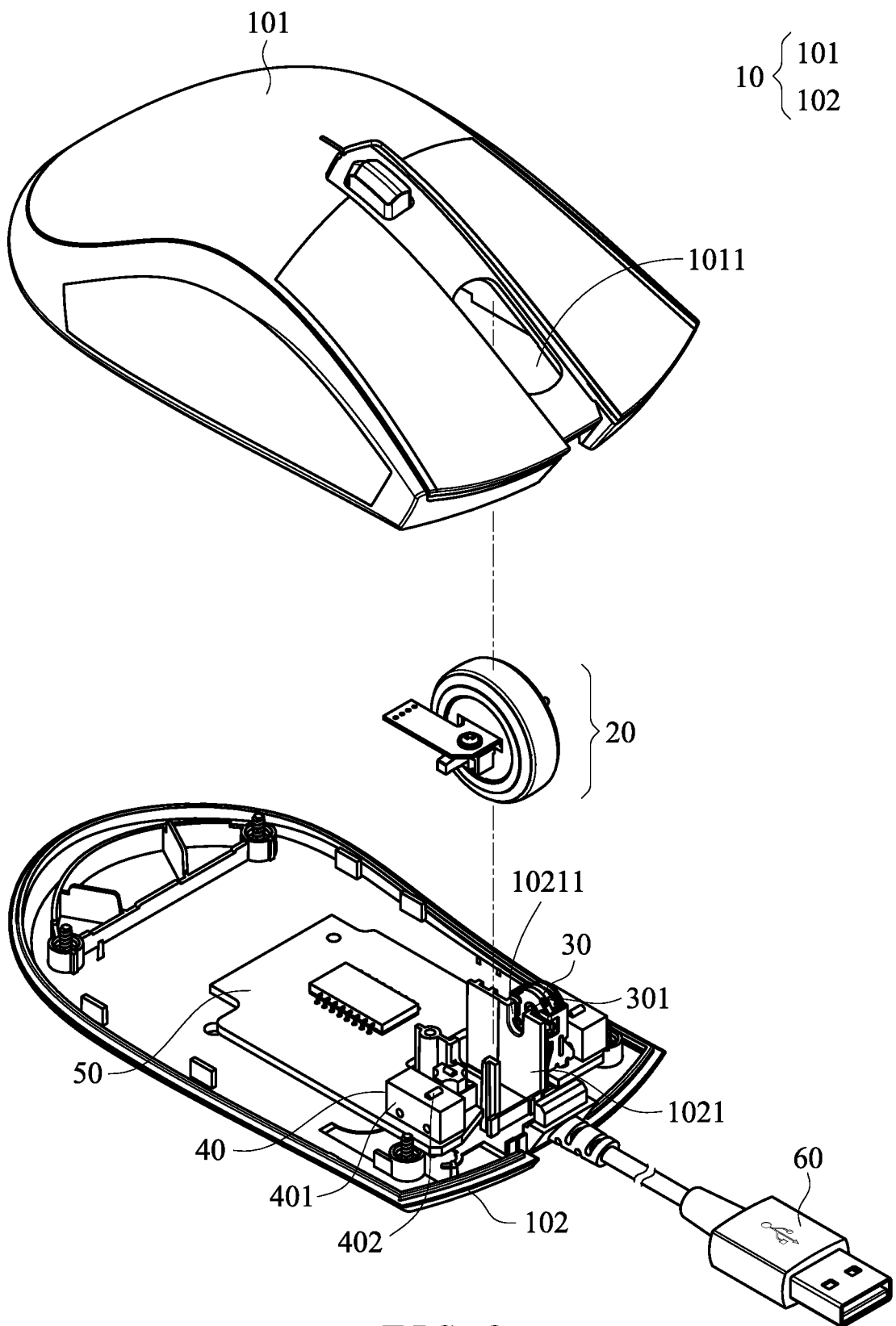
FIG. 3 is a three dimensional exploded view of a mouse according to the present invention.

First of all, referring to FIG. 3, FIG. 3 is a three dimensional exploded view of a mouse according to the present invention. In FIG. 3, a mouse 1 includes: a housing 10, a luminous scroll module 20, an encoder 30, a middle button switch module 40, a main circuit board 50, and an electrical connector 60.

The housing 10 includes: a top cover 101 and a bottom 102, where the luminous scroll module 20, the encoder 30, the middle button switch module 40, and the main circuit board 50 are disposed in an inner space formed by combining the top cover 101 and the bottom 102. The main circuit board 50 is fixedly disposed on the bottom 102, and the encoder 30 and the middle button switch module 40 are disposed on the main circuit board 50. The encoder 30 is provided with a polygonal axle hole 301. The middle button switch module 40 is provided with a switch member 401 and a triggering portion 402 located on the switch member 401. A supporting element 1021 protrudes upward from the bottom 102, and the supporting element 1021 is located at a side of the encoder 30 and is provided with a sliding hole 10211 corresponding to the polygonal axle hole 301. The luminous scroll module 20 is pivotally disposed in the sliding hole 10211 and connected to the encoder 30 through the polygonal axle hole 301. A control end of the top cover 101 is provided with a scroll through hole 1011, and the luminous scroll module 20 can be partially exploded and protrude from the scroll through hole 1011. The electronic connector 60 is electrically connected to the main circuit board 50. The electronic connector 60 may be a universal serial bus port, for example, a USB 2.0, USB 3.0, or USB 3.1, and may be used to output a button signal, a middle button signal, or a scroll signal to an electronic device or a calculator (not shown in the figure, such as a laptop or a personal computer) connected to the mouse 1. Although this embodiment only proposes the implementation of connecting the electronic device or the calculator by using the wired electronic connector 60, in practical applications, the electronic connector 60 can also be replaced by a known wireless connection module, and does not limited to the implementation proposed in this embodiment.

When a user flicks the luminous scroll module 20, the luminous scroll module 20 drives the encoder 30 and the encoder 30 immediately senses a rotation distance, a rotation direction, and a rotation speed of the luminous scroll module 20, to output a corresponding scroll signal. When a user presses the luminous scroll module 20, the luminous scroll module 20 moves downward along the sliding hole 10211 and presses the triggering portion 402 of the middle button switch module 40, to output a corresponding middle button signal.

Figure 4A:
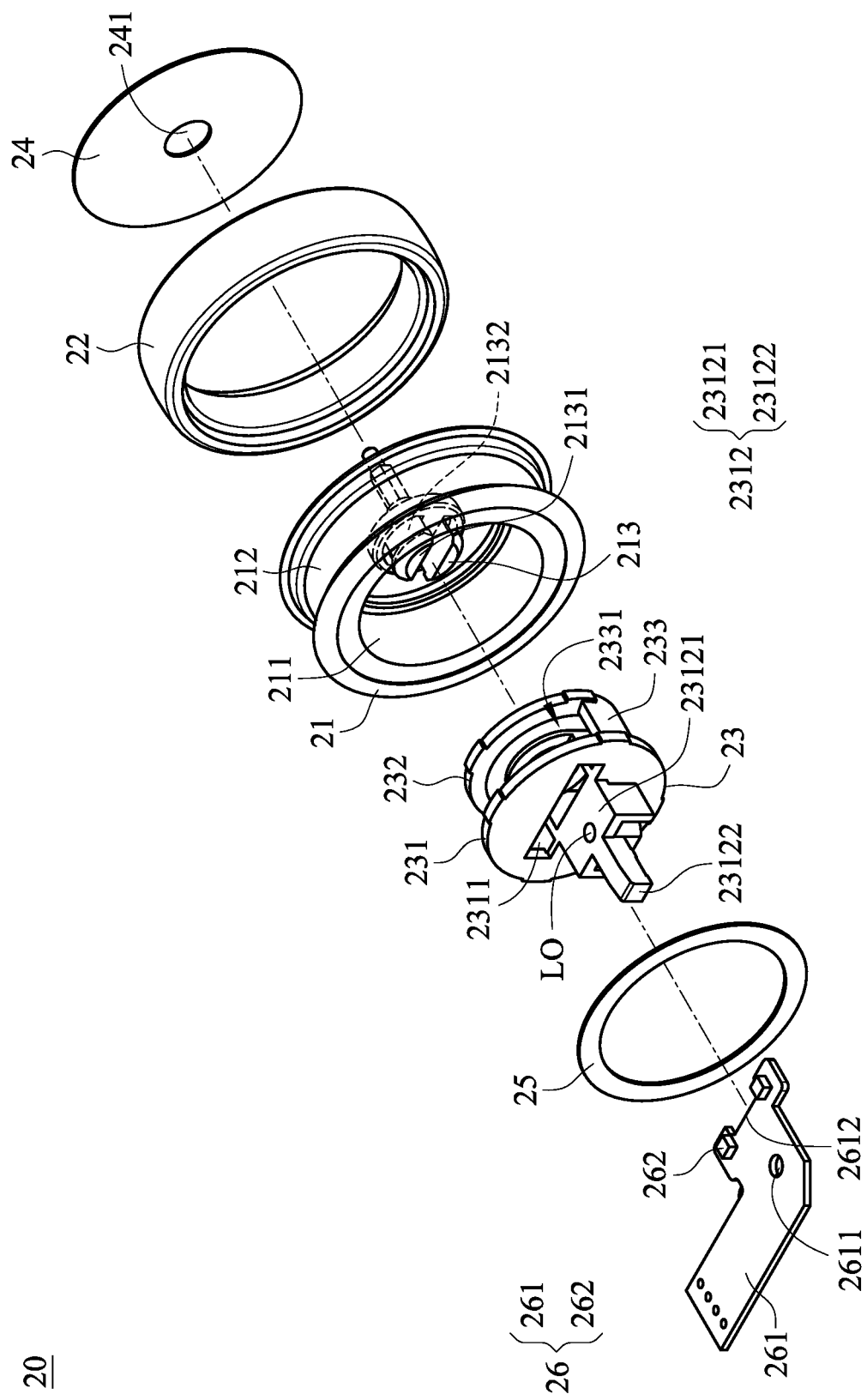
FIG. 4A is a three dimensional exploded view of a luminous scroll module from a perspective according to the present invention.
Figure 4B:
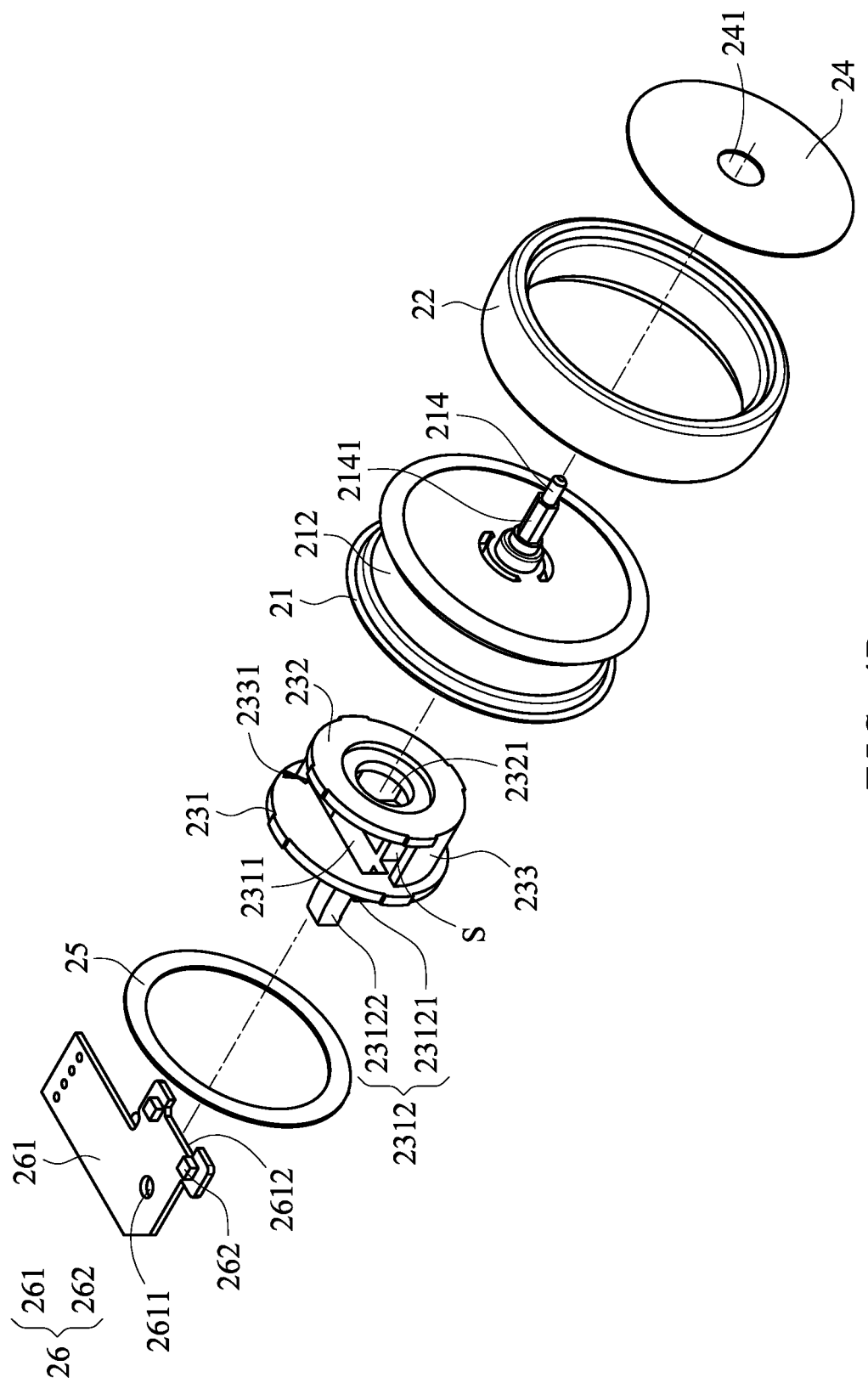
FIG. 4B is a three dimensional exploded view of the luminous scroll module from another perspective according to the present invention.

Referring to FIG. 4A and FIG. 4B, FIG. 4A is a three dimensional exploded view of the luminous scroll module from a perspective according to the present invention, and FIG. 4B is a three dimensional exploded view of the luminous scroll module from another perspective according to the present invention. The luminous scroll module 20 includes: a scroll 21, a rim 22, an inner wheel 23, a circular shading element 24, an annular shading element 25, and a luminous module 26.

The scroll 21 includes: a groove 211, an annular groove 212, a clamping element 213, and a rotating shaft 214. The clamping element 213 is disposed on a bottom surface of the groove 211 and is provided with a stopping portion 2131 and a necking portion 2132 connected to the stopping portion 2131. The annular groove 212 is disposed on an outer circumference of the scroll 21, and the rim 22 is sheathed in the annular groove 212. The rim 22 is made of an opaque elastic material, to increase a friction force on the surface of the scroll 21 and improve the feel of pressing. The rotating shaft 214 is disposed on another surface opposite to the groove 211, and the rotating shaft 214 is provided with a polygonal shaft portion 2141 corresponding to the polygonal axle hole 301 of the encoder 30. In another aspect, the circular shading element 24 is configured to cover another surface opposite to the groove 211 and is provided with a central hole 241 corresponding to the rotating shaft 214. When installing the scroll 21, the rotating shaft 214 sequentially passes through the sliding hole 10211 of the supporting element 1021 and the polygonal axle hole 301 (as shown in FIG. 3) of the encoder 30, and the polygonal shaft portion 2141 passes through and is fastened in the polygonal axle hole 301, so that the luminous scroll module 20 drives the encoder 30 to rotate.

The inner wheel 23 is arranged in the groove 211 of the scroll 21, where the inner wheel 23 includes: a first side plate 231, a second side plate 232, and an outer ring wall 233. The outer ring wall 233 is configured to connect the first side plate 231 and the second side plate 232 to form an accommodating space S. The outer ring wall 233 is provided with a light source opening 2331. An outer surface of the first side plate 231 is provided with a first opening 2311 running through the first side plate 231, and a pressing element 2312 located at a side of the first opening 2311, and the accommodating space S is in communication with the first opening 2311 and the light source opening 2331. In this embodiment, the pressing element 2312 is provided with a pressing portion 23122 and a fastening portion 23121 connected to the pressing portion 23122. The pressing portion 23122 is configured to press the triggering portion 402 of the middle button switch module 40, and the fastening portion 23121 is configured to carry and fasten the luminous module 26, and a surface of the fastening portion 23121 is provided with a first locking hole LO configured to lock the luminous module 26. A center of the second side plate 232 is provided with a second opening 2321 running through the second side plate 232, and the stopping portion 2131 of the clamping element 213 is forced into the second opening 2321 by contraction, so that the second side plate 232 is clamped at the position of the necking portion 2132 and that the second side plate 232 is pivotally connected to the clamping element 213, thereby enabling the scroll 21 to rotate relative to the inner wheel 23.

The annular shading element 25 is disposed around the groove 211, and is configured to cover a gap between the scroll 21 and the first side plate 231 of the inner wheel 23. Configuration of the annular shading element 25 does not affect the relative rotation between the scroll 21 and the inner wheel 23. In another possible implementation, the annular shading element 25 may alternatively be disposed at an edge of an outer surface of the first side plate 231 and cover the gap between the first side plate 231 of the inner wheel 23 and the scroll 21.

The luminous module 26 includes: a circuit board 261 and one or more luminous units 262. The circuit board 261 is provided with a second locking hole 2611 disposed corresponding to the first locking hole LO, and a receiving opening 2612 disposed corresponding to the stopping portion 2131 of the clamping element 213. The luminous unit 262 is in a form of top view emitting and is disposed on a surface of the circuit board 261. The luminous unit 262 may be: a light emitting diode unit, an organic light emitting diode unit, a quantum dot light emitting diode unit, or an electroluminescent unit. In this embodiment, the circuit board 261 partially passes through the first opening 2311, so that the luminous unit 262 is arranged in the accommodating space S, and the receiving opening 2612 disposed at an end of the circuit board 261 avoids interference between the circuit board 261 and the clamping element 213. In another aspect, the fastening portion 23121 is configured to carry a part of the circuit board 261 which does not pass through the first opening 2311, and a locking element (not shown in the figure) may sequentially pass through the second locking hole 2611 and the first locking hole LO, to fasten the luminous module 26.

Figure 5:
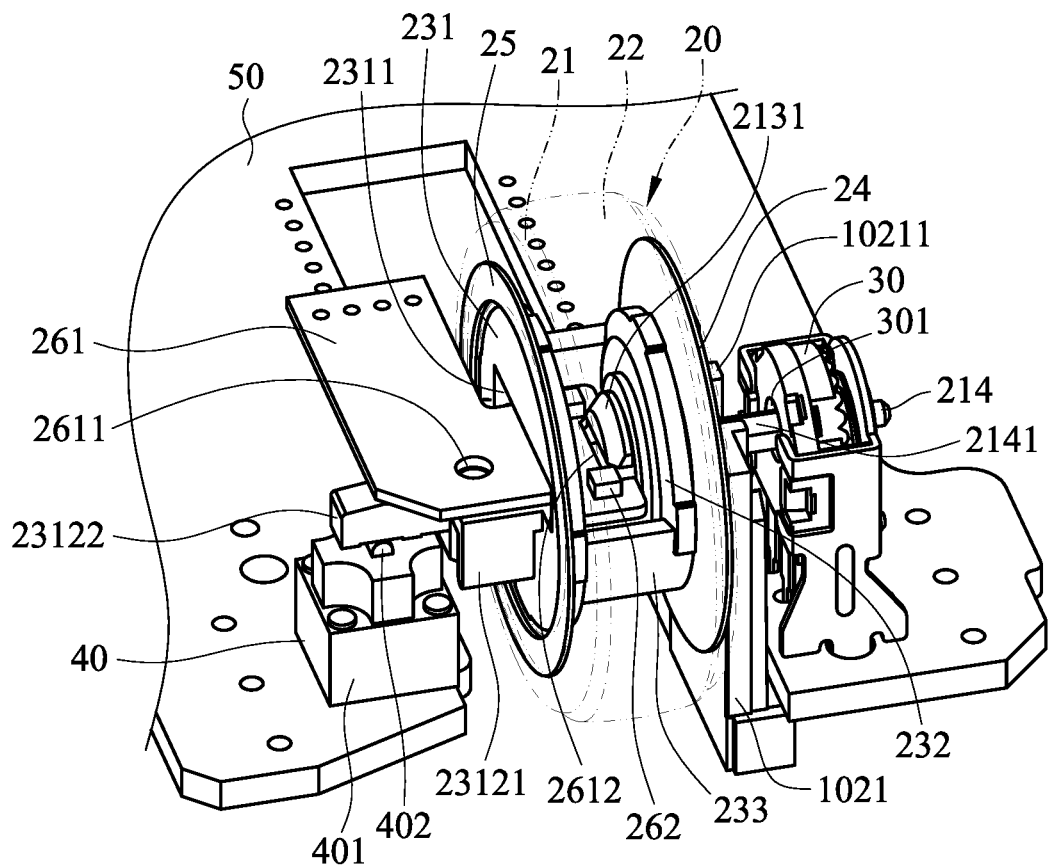
FIG. 5 is a partial perspective view of the luminous scroll module according to the present invention.

Referring to FIG. 5, FIG. 5 is a partial perspective view of the luminous scroll module according to the present invention. In FIG. 5, the rotating shaft 214 sequentially passes through the sliding hole 10211 of the supporting element 1021 and the polygonal axle hole 301 of the encoder 30, and the polygonal shaft portion 2141 passes through and is fastened in the polygonal axle hole 301. The pressing portion 23122 is arranged above the middle button switch module 40 and configured to abut or press against the triggering portion 402 of the middle button switch module 40. Moreover, the fastening portion 23121 is configured to carry and fasten the circuit board 261 of the luminous module 26. When the scroll 21 rotates, the pressing portion 23122 does not rotate. Therefore, the problem of abrasion between the pressing portion 23122 and the middle button switch module 40 does not occur. Besides, the luminous unit 262 is arranged in the inner wheel 23 (as shown in FIG. 4A and FIG. 4B), damage to the luminous unit 262 caused by electrostatic discharge (Electrostatic Discharge, ESD) that is generated by rotation of the scroll 21 can be avoided by means of shielding by the inner wheel 23.

Figure 6A:
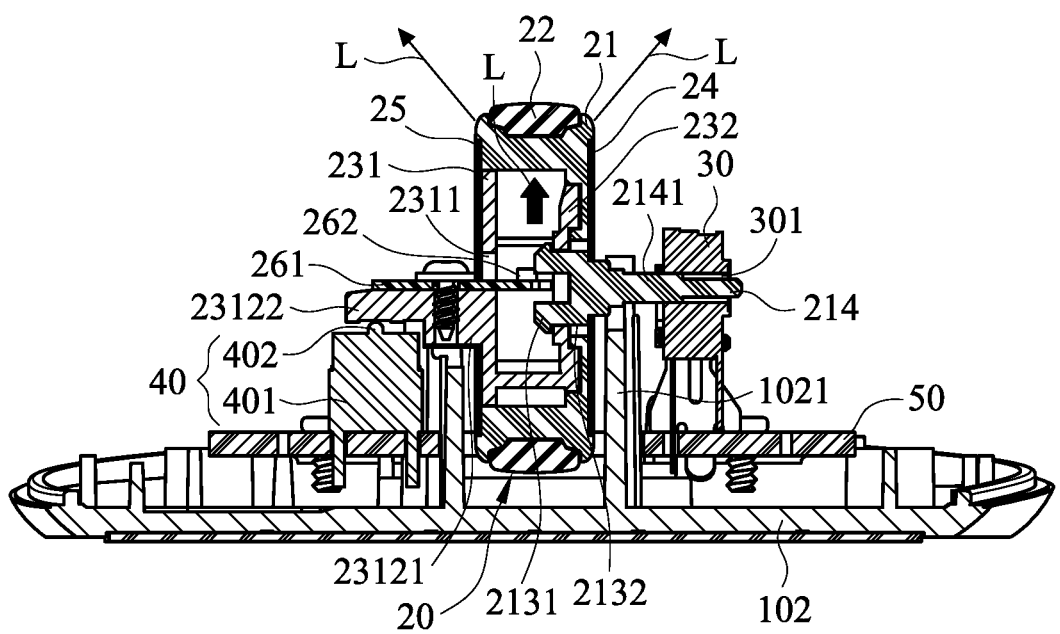
FIG. 6A and FIG. 6B are schematic diagrams of actuation of the luminous scroll module.
Figure 6B:
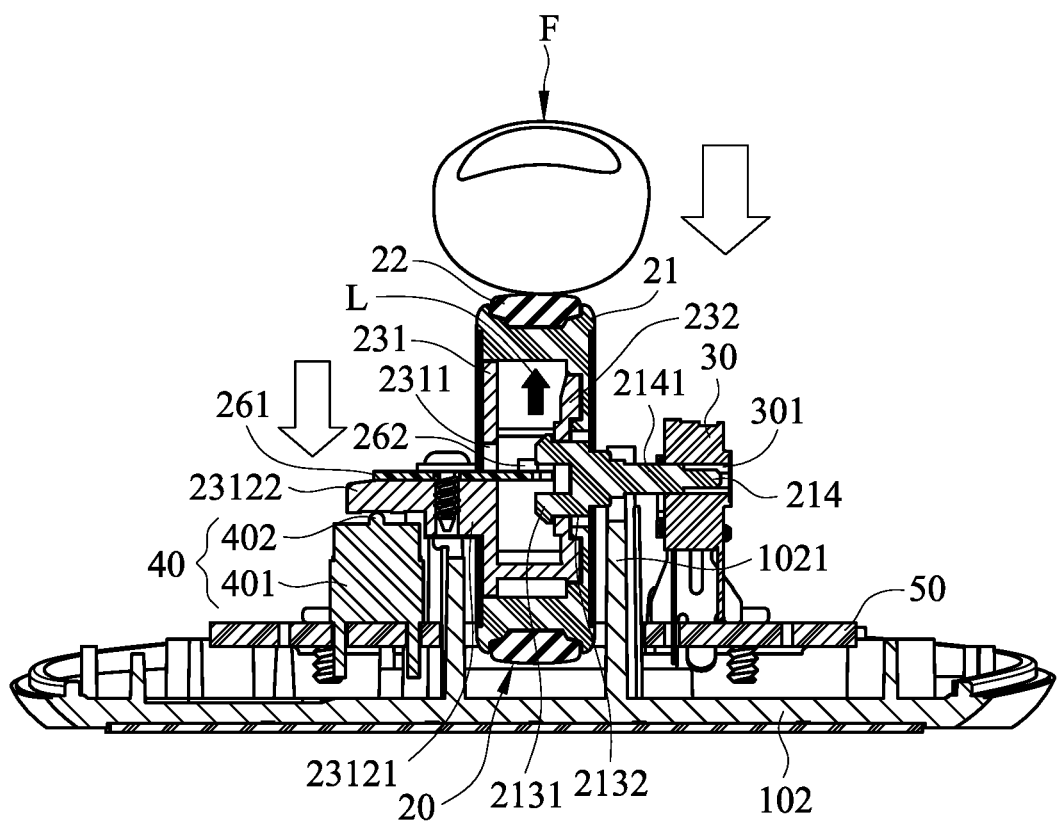

Referring to FIG. 6A and FIG. 6B, FIG. 6A and FIG. 6B are schematic diagrams of actuation of the luminous scroll module. In FIG. 6A, the luminous unit 262 emits a light beam L upward, and the light beam L passes through the light source opening 2331 (as shown in FIG. 4A and FIG. 4B) to the scroll 21. The circular shading element 24 and the annular shading element 25 prevent the light beam L from revealing from two opposite sides of the scroll 21. In another aspect, the light beam L may reveal from a position that is not covered by the circular shading element 24, the annular shading element 25, and the rim 22, so that the luminous scroll module 20 generates a luminous visual effect. Compared with a scroll structure of a conventional mouse, no rotating shaft is designed in the groove 211 of the scroll 21 of the present invention. Therefore, freedom of installing the luminous module 26 is improved. In another aspect, there is also no problems of luminance decrease caused by installing the luminous module 26 below the rotating shaft, and light leakage caused by installing the luminous module 26 above the rotating shaft or influence on a tilted design of the control end of the mouse. Although this embodiment only proposes the implementation made of the opaque elastic material, in practical applications, the rim 22 may alternatively be made of a transparent elastic material, so that the light beam L reveals from the position at which the rim 22 is disposed after being transmitted to the scroll 21.

In FIG. 6B, when a user presses the luminous scroll module 20 with a finger F, the inner wheel 23 moves downward along with the scroll 21. The luminous module 26 is disposed in the inner wheel 23, and the luminous module 26 therefore moves downward with the inner wheel 23, such that the luminous unit 262 of the luminous module 26 and an inner circumference of the groove 211 of the scroll 21 are kept at a fixed distance, to maintain the luminance of the luminous scroll module 20. The configuration method of synchronous displacement can also effectively avoid the problem of light leakage.

Compared with the scroll structure of the conventional mouse in the prior art, by the configuration of the luminous module of the luminous scroll module provided in the present invention, the tilted design of the control end of the mouse is not affected, and further the problems of luminance decrease, luminance change, and light leakage of the luminous scroll module can be avoided. In another aspect, the pressing element pressing against the middle button switch module does not rotate along with the scroll, and the abrasion of the middle button switch module can be alleviated. Therefore, the present invention is actually a creation of great industrial value.

The present invention may be modified in various ways by persons skilled in the art by using any technical means; however, all of these are subject to the protection of the appended claims.

What is claimed is:

1. A luminous scroll module, applied to a mouse, comprising:
   a scroll, comprising:
      a groove; and
      a clamping element, disposed on a bottom surface of the groove;
   an inner wheel, disposed in the groove, comprising:
      a first side plate, provided with a first opening;

a second side plate, pivotally connected to the clamping element, so that the scroll rotates relative to the inner wheel;

an outer ring wall, connecting the first side plate and the second side plate to form an accommodating space, wherein the outer ring wall is provided with a light source opening and the accommodating space is in communication with the first opening and the light source opening, wherein the scroll is provided with a rotating shaft and the rotating shaft is disposed on another surface opposite to the groove; and a circular shading element, wherein the circular shading element is configured to cover said another surface opposite to the groove and is provided with a central hole corresponding to the rotating shaft; and a luminous module, comprising:
a circuit board; and
at least one luminous unit, disposed on a surface of the circuit board, wherein the circuit board partially passes through the first opening, so that the at least one luminous unit is arranged in the accommodating space, wherein the at least one luminous unit is configured to emit a light beam and the light beam passes through the light source opening to the scroll.

2. The luminous scroll module according to claim 1, wherein an outer circumference of the scroll is provided with an annular groove and a rim is sheathed in the annular groove.

3. The luminous scroll module according to claim 1, wherein the rotating shaft is provided with a polygonal shaft portion and the polygonal shaft portion is configured to connect an encoder of the mouse.

4. The luminous scroll module according to claim 1, wherein a pressing element protrudes from an outer surface of the first side plate and the pressing element is located at a side of the first opening to press a middle button switch module in the mouse.

5. The luminous scroll module according to claim 4, wherein the pressing element is provided with a pressing portion and a fastening portion connected to the pressing portion, the pressing portion is configured to press a triggering portion of the middle button switch module, and the fastening portion is configured to carry and fasten the circuit board.

6. The luminous scroll module according to claim 1, wherein the second side plate is provided with a second opening.

7. The luminous scroll module according to claim 6, wherein the clamping element is provided with a stopping portion and a necking portion connected to the stopping portion, and the stopping portion is capable of being forced into the second opening, so that the second side plate is clamped at the necking portion.

8. The luminous scroll module according to claim 7, wherein an end of the circuit board that passes through the first opening is provided with a receiving opening, and the receiving opening corresponds to the stopping portion, to avoid interference between the circuit board and the clamping element.

9. The luminous scroll module according to claim 1, further comprising an annular shading element, wherein the annular shading element is disposed around the groove and configured to cover a gap between the scroll and the first side plate.

10. A luminous scroll module, applied to a mouse, comprising:
a scroll, comprising:
a groove; and
a clamping element, disposed on a bottom surface of the groove, wherein the clamping element is provided with a stopping portion and a necking portion connected to the stopping portion;

an inner wheel, disposed in the groove, comprising:
a first side plate, provided with a first opening;
a second side plate, pivotally connected to the clamping element, so that the scroll rotates relative to the inner wheel, wherein the second side plate is provided with a second opening, and the stopping portion of the clamping element is capable of being forced into the second opening, so that the second side plate is clamped at the necking portion; and an outer ring wall, connecting the first side plate and the second side plate to form an accommodating space, wherein the outer ring wall is provided with a light source opening and the accommodating space is in communication with the first opening and the light source opening; and a luminous module, comprising:
a circuit board; and
at least one luminous unit, disposed on a surface of the circuit board, wherein the circuit board partially passes through the first opening, so that the at least one luminous unit is arranged in the accommodating space,
wherein the at least one luminous unit is configured to emit a light beam and the light beam passes through the light source opening to the scroll, wherein an end of the circuit board that passes through the first opening is provided with a receiving opening, and the receiving opening corresponds to the stopping portion, to avoid interference between the circuit board and the clamping element.

* * * * *